United States Patent Office 2,702,810
Patented Feb. 22, 1955

2,702,810

3-HYDROXY-5-PREGNENE-7,11,20-TRIONES AND ESTERS THEREOF

Herbert C. Murray, Hickory Corners, and Durey H. Peterson, Kalamazoo Township, Kalamazoo County, Mich., assignors to The Upjohn Company, Kalamazoo, Mich., a corporation of Michigan No Drawing. Application August 26, 1953,
Serial No. 376,738

6 Claims. (Cl. 260—397.45)

The present invention relates to new organic compounds and is more particularly concerned with a novel process for the preparation of 3β-hydroxy-5-pregnene-7,-11,20-trione and its esters and with the products thus-produced.

The compounds of the present invention represented by the following formula:

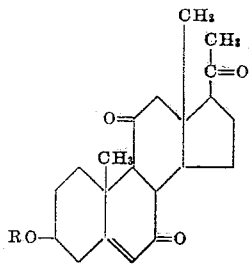

wherein R is hydrogen or a hydrocarbon-carboxylic acyl radical, are prepared by reacting 3β,7,11α-trihydroxy-5-pregnene-20-one or 3β,11α-dihydroxy-5-pregnene-7,20-dione with an oxidizing agent to produce 3β-hydroxy-5-pregnene-7,11,20-trione which may then be esterified. The starting compounds utilized in the process of the present invention may be prepared by subjecting pregnenolone (3β-hydroxy-5-pregnene-20-one) to the oxygenating action of a culture of fungus of the order Mucorales as set forth in our applications, of which the present application is a continuation-in-part, Serial No. 180,496, filed August 19, 1950, now abandoned, Serial No. 272,944, filed February 23, 1952, issued July 8, 1952, as Patent No. 2,602,769, and copending Serial No. 296,742, filed July 1, 1952, now abandoned.

It is an object of this invention to prepare the novel 3β-hydroxy-5-pregnene-7,11,20-trione and its esters. It is a further object of the present invention to provide a novel process for the preparation of 3β-hydroxy-5-pregnene-7,11,20-trione. Another object of this invention is to provide a novel process for the preparation of esters of 3β-hydroxy-5-pregnene-7,11,20-trione. Other objects will be apparent to those skilled in the art to which this invention pertains.

The thermostable compounds of the present invention have exhibited pharmacological properties and are useful as chemical intermediates. They exhibit anti-hypertensive, anti-estrogenic, anti-progesterone, anti-testoid, anti-folliculoid, and anaesthetic activities. The compounds of the present invention may be converted to the known 11-ketoprogesterone, by hydrogenation with lithium aluminum hydride to give 3-acyloxy-7,11,20-trihydroxy- or 3,7,11,20-tetrahydroxy-5-pregnene which is oxidized with manganese dioxide in chloroform to 3-acyloxy-11,20-dihydroxy- or 3,11,20-trihydroxy-5-pregnene-7-one. The thus-obtained 7-ketone is reduced by the Wolff-Kishner method to give 3-acyloxy-11,20-dihydroxy-5-pregnene or 3,11,20 - trihydroxy - 5 - pregnene. 3,11,20-trihydroxy-5-pregnene thus-obtained or prepared by saponification of 3 - acyloxy - 11,20-dihydroxy-5-pregnene is oxidized with chromic acid to 11-ketoprogesterone.

In the process of the present invention, the starting steroid selected from the group consisting of 3β,7,11α-trihydroxy-5-pregnene-20-one and 3β,11α-dihydroxy-5-pregnene-7,20-dione is dissolved in a solvent such as, for example, glacial acetic acid, and oxidized with a suitable oxidizing agent such as, for example, chromium trioxide, chromic acid, potassium permanganate, N-bromo-succinimide in the presence of an acid binding agent, and others. Chromium trioxide has been found to be a satisfactory oxidizing agent, converting the starting steroid to desired product in high yield. The oxidizing agent is usually used in a proportion greater than theoretical to completely convert the starting steroid to 3β-hydroxy-5-pregnene-7,-11,20-trione, although other proportions are within the scope of the present invention. The oxidizing agent is usually added at room temperature and thereafter the reaction mixture is allowed to stand at a temperature between about zero degrees centigrade and the boiling point of the reaction mixture, usually room temperature. The time of reaction is dependent, in part, upon the oxidizing agent employed and the temperature at which the reaction is carried out. The solvent may then be removed by distillation, under vacuum, and the desired product precipitated by the addition of water which concomitantly dissolves any inorganic salts present. The 3β-hydroxy-5-pregnene-7,11,20-trione thus-produced may then be purified by filtration and subsequent recrystallization from a suitable solvent such as, for example, isopropyl alcohol, or chromatographic separation according to methods known in the art.

The following examples are illustrative of the process and products of the present invention, but are not to be construed as limiting.

*Preparation 1.—3β,7,11α-trihydroxy-5-pregnene-20-one*

A medium was prepared of twenty grams of Edamine enzymatic digest of lactalbumin, three grams of corn steep liquor and fifty grams of technical dextrose diluted to one liter with tap water and adjusted to a pH of 4.3 to 4.5. Eight liters of this sterilized medium was inoculated with *Rhizopus arrhizus* ATCC 11145 and incubated for nineteen hours at a temperature of 28 degrees centigrade using a rate of aeration and stirring such that the oxygen uptake was 6.3 to 7 millimoles per hour per liter of $Na_2SO_3$ according to the method of Cooper, Fernstrom and Miller, Ind. Eng. Chem., 36, 504 (1944). To this medium containing a nineteen-hour growth of *Rhizopus arrhizus* was added two grams of pregnenolone (3β-hydroxy-5-pregnene-20-one) in twenty milliliters of acetone to provide a suspension of the steroid in the culture. After an additional 75-hour period of incubation under the same conditions of temperature and aeration, the beer and mycelium were extracted and concentrated. The mycelium was filtered, washed twice, each time with a volume of acetone approximately equal to the volume of the mycelium and extracted twice, each time with a volume of methylene chloride approximately equal to the volume of the mycelium. The acetone and methylene chloride extracts including solvent were added to the beer filtrate. The mixed extracts and beer filtrate were extracted successively with four liters of methylene chloride and then with three two-liter portions of methylene chloride. The combined methylene chloride extracts were washed with two one-tenth by volume portions of a two percent aqueous solution of sodium bicarbonate and then with two one-tenth by volume portions of water. After drying the methylene chloride with about three to five grams of anhydrous sodium sulfate per liter of solvent and filtering, the solvent was removed by distillation leaving 3.3162 grams of crystalline residue. This residue was dissolved in 200 milliliters of benzene and chromotographed over 100 grams of alumina (acid washed, dried at 120 degrees centigrade for four hours). The column was developed with 200-milliliter portions of solvents as indicated in Table I.

Fractions 28 through 31 were combined, dissolved in ten milliliters of methanol, and concentrated until crystallization ensued. A few drops of water were added, the mixture was cooled, and the crystals were separated. Three recrystallizations from methanol, adding water to facilitate crystallization, or methanol-carbon tetrachloride yielded 375 milligrams of 3β,7,11α-trihydroxy-5-pregnene-20-one, melting point 247 to 248 and 250 to 255 degrees centigrade, $[\alpha]_D^{27}$ of minus 41 degrees (1.086 in methanol). Structure was verified by infrared spectra.

*Analysis.*—Calculated for $C_{21}H_{32}O_4$: C, 72.38; H, 9.25. Found: C, 72.34; H, 9.13.

*Preparation 2.—3β,11α-dihydroxy-5-pregnene-7,20-dione*

Eluate fractions 24 through 27 of the chromatographic eluates of Preparation 1 were dissolved in ten milliliters of methanol and concentrated until crystallization occurred. A few drops of water were added to facilitate completion of the crystallization, the mixture was cooled, and the crystals were filtered free of supernatant liquid yielding 382 milligrams of crystalline 3β, 11α-dihydroxy-5-pregnene-7,20-dione having a melting point of 228 to 230 degrees centigrade.

*Example 1.—3β-hydroxy-5-pregnene-7,11,20-trione*

A 28-milligram sample of 3β,11α-dihydroxy-5-pregnene-7,20-dione was dissolved in two milliliters of glacial acetic acid and a solution of 200 milligrams of chromium trioxide in a mixture of 0.2 milliliter of water and two milliliters of glacial acetic acid. The reaction mixture was kept at room temperature for sixteen hours whereafter the mixture was diluted with ten milliliters of methanol, and the volatile components thereafter distilled under vacuum. The residue was mixed with thirty milliliters of water and the whole extracted with three ten-milliliter portions of ether. The combined ether extracts were washed with two ten-milliliter portions of a five percent sodium bicarbonate solution followed by two ten-milliliter portions of water whereafter the ether layer was dried with anhydrous sodium sulfate. The ether layer was evaporated leaving a crystalline residue of 20.5 milligrams of 3β-hydroxy-5-pregnene-7,11,20-trione which melted at 228 to 229 degrees centigrade after two recrystallizations from 0.5 milliliter of ethyl acetate to which was added Skellysolve B, petroleum ether, to the point of turbidity. Infrared absorption spectrum confirmed the theoretical structure. The product had an $[\alpha]_D^{24}$ of minus 34 degrees (0.935 in chloroform).

*Analysis.*—Calculated for $C_{21}H_{28}O_4$: C, 73.23; H, 8.19. Found: C, 73.04; H, 8.42.

*Example 2.—3β-hydroxy-5-pregnene-7,11,20-trione*

A 27.5-milligram sample of 3β,7,11α-trihydroxy-5-pregnene-20-one was dissolved in five milliliters of glacial acetic acid and a solution of twenty milligrams of chromium trioxide in a mixture of a few drops of water and two milliliters of glacial acetic acid was then added thereto. The reaction mixture was kept at room temperature for fifteen hours whereafter the mixture was diluted with ten milliliters of methanol and the volatile components thereafter distilled under vacuum. The residue was mixed with twenty milliliters of water and the whole extracted with three twenty-milliliter portions of ether. The combined ether extracts were washed with two five-milliliter portions of a five percent sodium bicarbonate solution followed by three five-milliliter portions of water whereafter the ether layer was dried with anhydrous sodium sulfate. The ether was evaporated leaving a crystalline residue of 14.5 milligrams of 3β-hydroxy-5-pregnene-7,11,20-trione which melted at 227 to 228 degrees centigrade upon recrystallization from an acetone and ether mixture. Infrared absorption spectrum confirmed the identity of the product which was identical to the product obtained in Example 1.

*Example 3.—3β-acetoxy-5-pregnene-7,11,20-trione*

A fifty-milligram portion of 3β-hydroxy-5-pregnene-7,11,20-trione was dissolved in five milliliters of acetic anhydride and five milliliters of pyridine. The mixture was maintained at room temperature for 48 hours and then diluted to 100 milliliters with water. The diluted mixture was extracted successively with eighty-, forty-, and forty-milliliter portions of ether. The combined ether extracts were washed successively with fifteen milliliters of water, twice with fifteen-milliliter portions of normal hydrochloric acid, fifteen milliliters of water, three times with 25-milliliter portions of sodium bicarbonate solution, and three times with 25-milliliter portions of water. The washed ether solution was dried over anhydrous sodium sulfate and evaporated by a stream of air. The residue was taken up in methanol, freed of solvent, and twice reprecipitated from two milliliters of acetone by the dropwise addition of ether. Filtration yielded 3β-acetoxy-5-pregnene-7,11,20-trione.

*Example 4.—3β-propionyloxy-5-pregnene-7,11,20-trione*

In the same manner as given in Example 2, the 3β-propionyloxy-5-pregnene-7,11,20-trione is prepared using the equivalent proportion of propionic anhydride in place of acetic anhydride.

*Example 5.—3β-benzoxy-5-pregnene-7,11,20-trione*

In the same manner as given in Example 2, the 3β-benzoxy-5-pregnene-7,11,20-trione is prepared using the equivalent proportion of propionic anhydride in place of acetic anhydride.

Esters of 3β-hydroxy-5-pregnene-7,11,20-trione are prepared as shown above or according to various acylation procedures, as by reaction with ketene, ketenes of selected acids, selected acids, acid anhydrides, or acid chlorides, in an organic solvent such as pyridine or the like. Representative esters of 3β-hydroxy-5-pregnene-7,11,20-trione thus-prepared include one to eight carbon atom carboxylic acid acyloxy esters of saturated or unsaturated aliphatic or cycloaliphatic, carboxylic, aryl, arylalkyl, alkaryl, mono, di or polycarboxylic acids which form ester groups such as, for example, formyloxy, acetoxy, propionyloxy, dimethylacetoxy, trimethylacetoxy, butyryloxy, valeryloxy, hexanoyloxy, heptanoyloxy, octanoyloxy, benzoxy, phenylacetoxy, toluoloxy, naphthoyloxy, cyclopentylformyloxy, β-cyclopentylpropionyloxy, acryloyloxy, cyclohexylformyloxy, the half and diesters of malonic, maleic, succinic, glutaric and adipic acids, and the like. The acids may also contain non-interfering substituents, such as mono or poly halo, chloro, bromo, hydroxy, methoxy, and the like, if desired.

TABLE I

| Fraction | Solvent | Eluate Solids Milligrams |
|---|---|---|
| 1,2 | benzene | 195 |
| 3,4 | benzene plus 5 percent ether | 70 |
| 5-7 | benzene plus 10 percent ether | 56 |
| 8,9 | benzene plus 50 percent ether | 11 |
| 10,11 | ether | 7 |
| 12,13 | ether plus 5 percent $CHCl_3$ | 8 |
| 14,15 | ether plus 10 percent $CHCl_3$ | 32 |
| 16,17 | ether plus 50 percent $CHCl_3$ | 108 |
| 18,19 | chloroform | 590 |
| 20 | $CHCl_3$ plus 5 percent acetone | 37 |
| 21 | ----do---- | 24 |
| 22 | $CHCl_3$ plus 10 percent acetone | 43 |
| 23 | ----do---- | 37 |
| 24 | $CHCl_3$ plus 50 percent acetone | 171 |
| 25 | ----do---- | 155 |
| 26 | acetone | 399 |
| 27 | ----do---- | 110 |
| 28 | acetone plus 5 percent methanol | 244 |
| 29 | ----do---- | 125 |
| 30,31 | acetone plus 10 percent methanol | 118 |
| 32,33 | acetone plus 50 percent methanol | 73 |
| 34,35 | methanol | 27 |

It is to be understood that the invention is not to be limited to the exact details of operation or exact compounds shown and described as obvious modifications and equivalents will be apparent to one skilled in the art and the invention is therefore to be limited only by the scope of the appended claims.

We claim:
1. A compound represented by the formula:

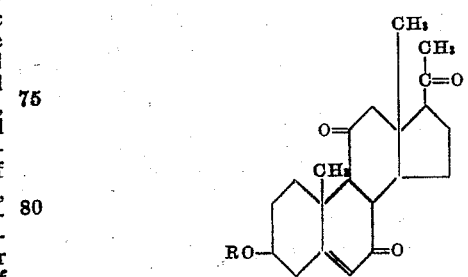

wherein R is selected from the radicals consisting of hydrogen and hydrocarbon-carboxylic acyl having less than nine carbon atoms.
2. 3β-hydroxy-5-pregnene-7,11,20-trione.
3. 3β-acyloxy-5-pregnene-7,11,20-trione wherein acyloxy is a hydrocarbon-carboxylic radical containing less than nine carbon atoms.
4. 3β-acetoxy-5-pregnene-7,11,20-trione.
5. 3β-propionyloxy-5-pregnene-7,11,20-trione.
6. 3β-benzoxy-5-pregnene-7,11,20-trione.

No references cited.